US006879053B1

(12) United States Patent
Welches et al.

(10) Patent No.: US 6,879,053 B1
(45) Date of Patent: Apr. 12, 2005

(54) TRANSFORMERLESS, LOAD ADAPTIVE SPEED CONTROLLER

(75) Inventors: Richard Shaun Welches, Amherst, NH (US); Daniel P. Hohm, Nashua, NH (US); Jian Wen, North Andover, MA (US); Kevin E LeRow, Lowell, MA (US); Richard Griessel, Derry, NH (US); Thomas O'Reilly, Hollis, NH (US)

(73) Assignee: Youtility, Inc., Hudson, NH (US)

(*) Notice: Subject to any disclaimer, the term of this patent is extended or adjusted under 35 U.S.C. 154(b) by 0 days.

(21) Appl. No.: 10/691,030

(22) Filed: Oct. 22, 2003

Related U.S. Application Data
(60) Provisional application No. 60/420,166, filed on Oct. 22, 2002.

(51) Int. Cl.[7] ................................................. H02P 9/00
(52) U.S. Cl. ........................... 290/6; 290/1 A; 290/4 R; 290/31; 290/32; 290/36; 290/38 R; 322/24; 322/10; 322/12; 322/13; 322/20
(58) Field of Search ............................ 290/6, 1 A, 4 R, 290/31, 32, 30 R, 36, 38 R; 322/24, 10, 12, 13, 20

(56) References Cited

U.S. PATENT DOCUMENTS

| | | |
|---|---|---|
| 3,885,644 A | 5/1975 | Seidler et al. |
| 4,694,189 A | 9/1987 | Haraguchi et al. |
| 4,912,618 A | 3/1990 | Krinickas, Jr. |
| 4,952,852 A | 8/1990 | Bando et al. |
| 5,081,368 A | 1/1992 | West |
| 5,225,712 A | 7/1993 | Erdman |
| 5,552,640 A | 9/1996 | Sutton et al. |
| 5,627,744 A | 5/1997 | Baker et al. |
| 5,880,533 A | 3/1999 | Arai et al. |
| 5,929,538 A | 7/1999 | O'Sullivan et al. |
| 6,175,163 B1 * | 1/2001 | Rinaldi et al. ................. 290/6 |
| 6,175,217 B1 | 1/2001 | Da Ponte et al. |
| 6,184,593 B1 | 2/2001 | Jungreis |
| 6,278,194 B1 * | 8/2001 | Nakagawa et al. ........... 290/31 |
| 6,404,655 B1 | 6/2002 | Welches |
| 6,445,079 B1 * | 9/2002 | Gale et al. ..................... 290/31 |

(Continued)

FOREIGN PATENT DOCUMENTS

| | | |
|---|---|---|
| GB | 2342631 A | 10/1999 |
| WO | WO-95/13646 A1 | 5/1995 |
| WO | WO-01/56133 A1 | 8/2001 |

OTHER PUBLICATIONS

Da Ponte, Manuel, "Quantum leap in on–site power generation technology", www.global–defense.com/2000/pages/voltamp.html, pp 1–4, global–defense.com, 2000.

(Continued)

*Primary Examiner*—Darren Schuberg
*Assistant Examiner*—Iraj A. Mohandesi
(74) *Attorney, Agent, or Firm*—Maine & Asmus

(57) ABSTRACT

The invention in the simplest form is an improved variable speed engine/generator set with an integrated power conditioning system and control method, used to generate high quality AC power with optimum fuel efficiency and reduced emissions. The variable speed generator control scheme allows for load adaptive speed control of engine and generator field. The transformerless power inverter topology and control method provides the necessary output frequency, voltage and/or current waveform regulation, harmonic distortion rejection, and provides for single phase, or unbalanced loading.

8 Claims, 9 Drawing Sheets

U.S. PATENT DOCUMENTS

| | | | |
|---|---|---|---|
| 6,462,976 B1 | 10/2002 | Olejniczal et al. | |
| 6,744,240 B2 * | 6/2004 | Koelle et al. | 322/20 |
| 6,787,931 B2 * | 9/2004 | Nakagawa et al. | 290/31 |
| 2003/0107349 A1 | 6/2003 | Haydock et al. | |
| 2003/0160514 A1 | 8/2003 | Rajagopalan | |

OTHER PUBLICATIONS

Fairley, Peter, "Steady as She Blows", IEEE Spectrum, Aug. 2003, pp. 35–39, The Institute of Electrical and Electronics Engineers, Inc., New York, NY.

Tolbert et al, "Electronic Power Conversion System for Advanced Moble Generator Set", pp. 1–6, 2001.

Andriulli, J.B. et al. "Advanced Power Generation Systems for the 21st Century: Market Survey and Recomendations for a Design Philosophy" pp. iv– 10–9, ORNL/TM–1999/213, Oak Ridge National Laboratory, Lockheed Martin Energy Research Corp for the US Dept. of Energy, 1999, Oak Ridge, TN.

Andriulli, J.B. et al. "Development of Proof–of–Concept Unites for the Advanced Medium–Sized Mobile Power Sources (AMMPS) Program" pp. i– 111, ORNL/TM–2001/222, Oak Ridge National Laboratory, www.osti.gov.bridge, 2001, Oak Ridge, TN.

* cited by examiner

TRANSFORMERLESS, LOAD ADAPTIVE SPEED CONTROLLER

RELATED APPLICATIONS

This application claims the benefit of U.S. Provisional Applications No. 60/420,166, filed Oct. 22, 2002. In addition, this application is related to concurrently filed U.S. Patent Application tbd filed Oct. 22, 2003 entitled Hybrid Variable Speed Generator/Uninterruptible Power Supply Power Converter; and U.S. Pat. No. 6,404,655. Each of these is herein incorporated in its entirety by reference.

FIELD OF THE INVENTION

The present invention relates to power generators, power converters and distribution schemes for power distribution. More specifically, the present invention relates to a variable speed engine/generator set with an integrated power conditioning system and control method to generate high quality AC power with optimum efficiency and reduced emissions.

BACKGROUND OF THE INVENTION

Electric power distribution is a necessary component of systems that operate with electronic power or in the distribution of electronic power. For example, most electronic equipment is a load that is connected to a utility grid, wherein power arrives in one form and is transferred and transformed into a form more suitable for the equipment.

The distribution of electric power from utility companies to households and businesses utilizes a network of utility lines connected to each residence and business. The network or grid is interconnected with various generating stations and substations that supply power to the various loads and that monitor the lines for problems. Distributed electric power generation, for example, converting power from photovoltaic devices, micro-turbines, or fuel cells at customer sites, can function in conjunction with the grid. Loads that are connected to the grid take the generated power and convert it to a usable form while excess power can supplement the grid.

An electric utility grid generally can also consist of many independent energy sources energizing the grid and providing power to the loads on the grid. This distributed power generation is becoming more common throughout the world as alternative energy sources are being used for the generation of electric power. In the United States, the deregulation of electric companies has spurred the development of independent energy sources co-existing with the electric utility. Rather than have completely independent energy sources for a particular load, these alternative energy sources can tie into the grid and are used to supplement the capacity of the electric utility.

The number and types of independent energy sources is growing rapidly, and can include photovoltaic devices, wind, hydro, fuel cells, storage systems such as battery, super-conducting, flywheel and capacitor types, and mechanical means including conventional and variable speed diesel or internal combustion (IC) engines, Stirling engines, gas turbines, and micro-turbines. In many cases these energy sources can sell the utility company excess power from their source that is utilized on their grid.

However, each of these independent energy sources needs some type of power converter that feeds energy to the grid or used to directly power the various loads. There must also be some means to provide protection when the grid becomes unstable. In most scenarios the utility company is still the main power source and in many cases controls the independent source to some extent.

Whether a power system is used to provide power to a load or a grid, the efficiency of the power system is important. The fuel consumption and the emissions should be minimized in all cases.

A problem with the state of the art systems is that typical internal combustion (IC) engine generator systems must rotate at a fixed speed to provide a fixed frequency output. This dramatically limits the engines maximum output or overload power, decreases part-load fuel efficiency, and consequently increases emissions/K Whr of power produced.

Another problem with the existing systems is that the distribution system is subject to non-linear, high harmonic content and unbalanced loading. This is especially true where the distributed generation system operates independent of the utility grid, and must therefore provide all of the load required harmonic currents. In distributed power applications, high harmonic content or unbalanced loads may lead to utility grid instability, resonances or other unanticipated distribution system behavior that may cause catastrophic failure of the distribution system components. Such a failure can result in damage to equipment and possibly personal injury.

Power converters, such as inverters, are necessary in modern power systems for the energy generating devices such as photovoltaic devices, micro-turbines, variable speed IC engines, fuel cells, and superconducting storage systems. In general, these systems generate AC or DC electricity that needs to be converted to a conditioned AC for feeding into the power grid or for direct connection to loads.

Grid independent DC-AC inverters generally behave as sinusoidal voltage sources that provide power directly to the loads. This type of power distribution architecture is generally required to provide power to both 3-phase and single-phase, or line to neutral connected loads. Typically, 3-phase power inverters meet the 3-phase plus neutral requirement by isolating the power inverter from the loads with a delta-wye power transformer.

Grid connected AC inverters generally behave as a current source that injects a controlled AC sine wave current into the utility line. The controlled AC current is generated in sync with the observed utility zero crossings, and may be exactly in phase, generating at unity power factor where upon real power only is exported. It is also possible to generate a variable amount out of phase—at other than unity power factor—where real and reactive power is exported to the grid. An effective change in reactive power output can be made by either phase shifting the output current waveform with respect to voltage or by creating an asymmetric distortion to the output current waveform.

Whether grid connected or grid independent, typical generators demonstrate poor output waveform total harmonic distortion (THD) when connected to any non-linear loads. This is particularly true in the case of even order harmonic currents ($2^{nd}$, $4^{th}$, $6^{th}$, $8^{th}$ etc.). More specifically, typical generators and power transformers common to most power distribution systems demonstrate a tendency to saturate especially when exposed to even order or DC content, load generated non-linear currents. This causes the generator output voltage waveform to rapidly degrade while simultaneously increasing generator losses and operating temperatures, and decreasing the power actually coupled from the engine to the electrical load. A variety of factors define how steep this saturation transition will occur, including magnetic core material and construction, magnitude and frequency of harmonics, and generator operating temperature. At the least, very poor output power quality, nuisance circuit breaker tripping, increased distribution system component loss and increased operating temperatures will be observed.

Although generator or transformer saturation is not as likely to occur in utility grid connected systems, primarily due to the utility grid's typically lower impedance than the grid connected inverter system, distortion and instability may still occur. This problem is greatly aggravated where generators, or transformer isolated power inverters act as "stand alone" voltage sources, where the generator or inverter comprises the only power source to the local distribution system.

These problems are currently solved in the distribution system by over sizing the generator or distribution transformers. For power inverters, expensive gapped core type isolation transformers are commonly employed to decrease the power conditioning system susceptibility to even order harmonic currents, as well as isolate inverter generated DC voltage offsets from the distribution system. The increased cost and space requirements for the isolation transformers are problems that are well known in the industry.

Inverters that perform an AC conversion function and are connected to the grid are known as "Utility-Interactive Inverters". Such inverters are the subject of several U.S. and international codes and standards, such as, the National Electrical Code, Article 690-Photovoltaic Systems; UL 1741, Standard for Photovoltaic Inverters; and IEEE 929- Recommended Practice for Utility Interface of Photovoltaic (PV) Systems.

One class of inverters, Pulse width modulator (PWM) inverters, is used in three-phase bridges, H-bridges, and half-bridge configurations. The bus capacitors, typically electrolytic, consist of two or more capacitors connected in series that are fed from a passive rectifier or actively switched front-end section.

In order to reduce the aforementioned problems, attempts have been made to produce an improved generator speed control and electronic power dispensing system. The present systems have general shortcomings and do not adequately address the aforementioned problems.

What is needed is a means of efficiently operating a variable speed generator with a fixed frequency electronic power inverter, at the optimum engine speed for a given load. This speed versus load curve may be optimized to develop the lowest possible emissions, highest possible efficiency, or even to provide the fastest transient response, or highest overload capability. This design must also be cost effective to manufacture and implement, and allow for easy incorporation into current designs.

BRIEF SUMMARY OF THE INVENTION

While adaptable in many forms, the invention is a variable speed generator, load adaptive engine speed control, generator field control/voltage regulator and power conditioning inverter suitable for use in modern power distribution systems. In addition to allowing variable speed engine operation, this invention has all the benefits of a power conditioning system including power factor correction of the generator output, more efficient generation of power, and, lower emissions especially when operated at part-load.

One embodiment of the present invention is an apparatus for generating AC power to a load, comprising a variable speed energy generating device producing differing amounts of power at different speeds. There is a power conditioning system coupled to the variable speed energy generating device, wherein the power conditioning system calculates a speed command based on the AC power that controls the variable speed energy generating device. A regulator section is coupled to the power conditioning system, and there is a converter coupled to the regulator section and producing the AC power, wherein the converter couples the AC power to the load. There can also be a bypass switch coupling the variable speed energy generating device to the load.

Variations of the apparatus include wherein the converter is selected from the group consisting of: transformerless AC pulse width modulator inverter, DC-AC inverter, static inverter, rotary converter, cycloconverter, and AC-AC motor generator set. The variable speed energy generating device can be selected from the group consisting of: internal combustion engine, turbine, micro-turbine and Stirling engine.

In one variation the regulator section is an enhanced conduction angle dual boost DC bus voltage regulator. The apparatus can further comprise a field winding coupled to the variable speed energy generating device. There can also be a speed sensor coupled to the variable speed energy generating device.

A further variation includes wherein the speed command is derived from engine speed versus load lookup tables. The speed command can also be calculated from exhaust content sensors.

In one embodiment there is an adaptive speed loop gain algorithm for detecting steady state speed errors.

A further embodiment of the invention is a method for producing quality AC output power to a load, comprising measuring a set of properties for an actual load output, measuring a speed of a variable speed energy generating device, calculating a speed command signal using the speed and the properties, converting the speed command signal into a throttle adjustment signal, and adjusting the speed of the engine using the throttle adjustment signal, thereby adjusting the AC output to the load.

Other steps in the method can include calculating a load shed term and reducing a portion of the load based on the load shed term. It can also include measuring a throttle position and calculating the speed command signal using the speed, the properties, and the throttle position. A further step can include regulating a generator voltage by adjusting a field voltage of a generator. The method of operation can also include a perturb and observe sequence for detecting steady state errors, such as increasing the speed and observing an increase speed error, decreasing the speed and observing a decrease speed error, and calculating a steady state speed error.

An additional embodiment of the invention is a variable speed generator system, comprising a variable speed engine with a throttle control and a generator coupled to said variable speed engine and generating an AC output. There is a voltage regulator section coupled to the AC output and producing a voltage regulated output. An inverter is coupled to the voltage regulated output, wherein the inverter output is coupled to a load. A power conditioning system has a speed versus load controller, wherein the speed versus load controller adjusts the throttle control based upon a speed command that is derived from the AC output and a speed versus load table. The voltage regulator section can be an enhanced conduction angle (ECA) dual boost DC bus voltage regulator.

There are a number of control loops possible for the present system. The speed versus load controller can comprise a field control loop and a speed control loop and even a throttle position feedback loop. There can also be a load shed term processing loop. An energy storage module can be coupled to the voltage regulator section.

The variable speed generator system can also comprise a throttle valve actuator coupled to the engine. The inverter output can be a voltage source coupled a load as opposed to a current source coupled to a grid.

The variable speed generator system can use a load versus power table based on conditions selected from the group consisting of maximum fuel efficiency, minimum emissions, and optimum transient load response.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION OF THE INVENTION

Figure 1:
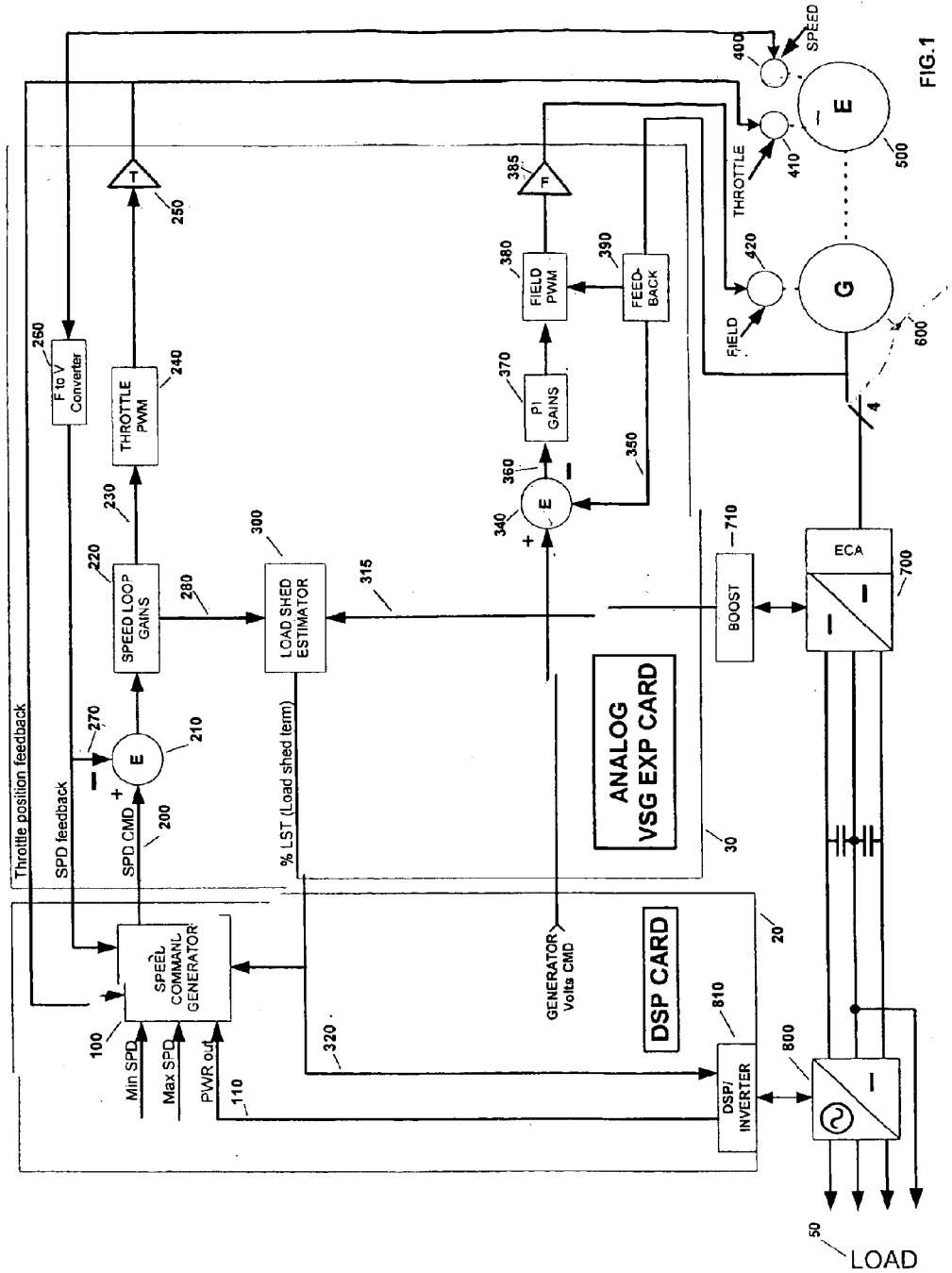
FIG. 1: Block diagram of VSG system with speed versus load controller in one implementation. The speed command generator resides in the digital signal processing (DSP) card, while the speed and field control loops reside on the analog expansion card. Also shown is throttle position feedback, based on throttle current, for use in fuel consumption and emissions developments.

Referring to FIG. 1, one embodiment of the present invention is depicted in block diagrammatic form. The variable speed generator system according to this embodiment couples the generator 600 and engine 500 through a power conditioning system (PCS) 20, 30 having a speed versus load controller wherein the speed command generator resides in the digital signal processing (DSP) circuit card 20. The speed and field control loops reside on the analog expansion card 30. The output from the generator 600 and engine 500 are coupled through an enhanced conduction angle (ECA) dual boost DC bus voltage regulator 700 and dual boost control section 710. And, there is an inverter 800 that is tied to the load.

There are many benefits of connecting a generator to a load through a power conditioning system (PCS). The generator is isolated from load-induced harmonics and imbalances, such as unequal or non-sinusoidal loads on each phase, and the output voltage regulation is improved. The output impedance is lowered and the interconnection to the grid is simplified. The fault shutdown is faster and therefore has an inherent reduction of short circuit or fault currents. This invention also allows the ability to provide synthetic "soft-starting" of transient loads. Further benefits include the PCS mitigation of load reactive power requirements, such that the generator provides power only at near-unity power factor regardless of load reactance.

A further aspect of the invention is that operation at reduced speed, while potentially much more efficient and audibly quieter, deprives the engine/generator of the additional power overhead required to maintain speed and simultaneously source power to an instantaneously applied increase in load or a "step load". This reduction in overhead can stall the engine and cause a power outage condition.

There are several actions that can be taken to avoid stalling problems. One solution is to increase the throttle command (fuel supply), as torque multiplied by speed equals power, operation at a higher speed allows for more power from an engine. Each engine has a power curve that establishes the maximum revolutions per minute (RPM) and associated ideal power output. However increasing the throttle alone may be inadequate to prevent an engine stall depending upon the engine, external variables and the step load. Another option is to 'shed' a portion of the load long enough such that the engine/generator can be accelerated to the optimum speed for the new load conditions. One approach of the present invention is to take both of these actions simultaneously thereby increasing the throttle command and shedding some portion of the load.

Modern combustion engines used for power generation are typically at the bottom of their power curve when operated as a fixed speed generator (typically 1800 RPM). Engine torque and consequently power is affected by a number of variables, including ambient temperature, altitude (air pressure), fuel type, and engine component wear. Thus, utilization of a static "look-up" table without dynamic feedback for engine torque, power, and speed to estimate an optimum speed set point for a given load is impractical or at the very least cumbersome.

However, it is possible to provide greatly increased power output by simply increasing engine speed as described in certain embodiments herein. There is a limit for efficiency as the frictional, windage, and pumping losses increase with the speed, often exponentially. The opposite is also true for decreases in speed. Thus, it is possible to realize efficiency gains as well as emissions reductions by reducing the operating speed to the minimum required to feed a given load while simultaneously feeding engine losses.

The present invention can automatically adjust the throttle settings to control engine speed and provide feedback from the throttle position to increase or decrease the speed command. This closed loop system derives an internal speed command, within programmable minimum and maximum values, such that the minimum possible fuel flow (throttle position) may be maintained for a given load. This approach is ideal for electronic fuel injected (EFI) engines.

In addition to throttle control, the present invention may also shed some of the load. The composite "speed error signal" is sent to a "load shedding" circuit which causes a portion of the load to be shed by reducing the output PWM inverter AC voltage, such that the engine has enough power to accelerate to the new speed set point. It is within the scope of the invention to allow a small load shed for a longer time or a large load shed for a shorter time via programmable parameter. Thus, the engine/generator is allowed enough power to reach the speed set point while shedding the minimum amount of load. This control adapts to the available engine torque and sheds load by only the minimum possible amount, thereby reducing the magnitude of output voltage sag provided to the load.

The composite "speed error signal" is actually the sum of the speed error and the DC current limit signal. The "speed error" signal is calculated by a PI circuit that measures the difference between the speed command and the actual speed that is then multiplied by the PI gain. The "DC boost current limit" signal is the difference between the actual DC current and the pre-defined DC current limit, which is also then multiplied by a PI gain. These two signals are summed to provide the composite "speed error signal".

Referring again to FIG. 1, in addition to the power conditions system 20, 30, the variable speed generator (VSG) includes a transformerless AC PWM inverter 800 and inverter control 810 that couples to the load 50. There is an enhanced conduction angle (ECA) dual boost DC bus voltage regulator 700 and dual boost control section 710 for power conditioning. The generator 600 and internal combustion (IC) engine 500 are coupled to the ECA 700 which provides the DC output to the inverter 800 that is tied to the load 50. The generator 600 can employ a field winding 420 for synchronous type generators. There are various interconnection techniques to tie the inverter 800 to the load and grid 50 as is known in the art.

The engine provides the electrical power source to the generator and there are numerous possibilities for this engine/generator arrangement. In general, these systems generate AC or DC electricity that needs to be converted to a conditioned AC for feeding into the power grid or for direct connection to loads. Energy generating devices such as photovoltaic devices, wind systems, hydro systems, micro-turbines, variable speed internal combustion engines, Stirling engines, gas turbines, fuel cells, and storage systems such as battery, super-conducting, flywheel and capacitor types are all within the scope of the invention to the extent that they are speed controllable. These energy sources can even sell the utility company excess power from their source that is utilized on their grid.

Within the DSP card 20, the VSG engine primary speed command generator section 100 receives actual output power feedback 110 from the PWM inverter processor 810. In one embodiment, there is a speed versus load user-programmable lookup table (not shown) that has pre-programmed points that make a curve of optimum engine speed versus load for a given application. The inverter control 810 calculates each AC phase current, voltage and phase angle of the load 50 and sends the actual "real" power out signal (PWR out) 110 to the speed command generator 100. The actual load defines the optimum engine speed for a given "actual load power" as the speed command generator 100 has apriori engine performance characteristics such as the minimum and maximum speed (Min SPD and Max SPD) of the generator 500. The speed command generator 100 also encompasses a speed feedback signal (SPD feedback) and a throttle position feedback that can be used to control system performance. The output of the speed command generator 100 is the actual speed command (SPD CMD) that represents the amount of power and engine speed required to achieve a no load shed condition, which is the full output AC voltage and thus full load required power. In one variation there is a VSG engine secondary "speed command generator" that resides in the DSP/Inverter 810 that is used for extreme load transients.

In the speed summer 210, the speed command 200 is summed with the speed feedback (SPD feedback) 270. The speed feedback 270 is obtained from the frequency to voltage converter 260 which receives the engine speed feedback from the speed sensor pick up 400 that couples to the engine 500. Alternative speed sensors, such as zero crossing detectors connected to the generator magneto and tachometers are also within the scope of the invention.

The throttle control system interacts with an electro-mechanical throttle actuator 410 that is based on throttle current for use in fuel consumption and emissions applications. As part of the throttle feedback system, one of the outputs of the proportional integral (PI) speed summing amplifier 210 is the speed error signal, which is fed to the speed loop gains PI amplifier 220 where the signal is processed and amplified. The speed loop gains output signal 230 is coupled to the throttle pulse width modulator (PWM) 240 that processes the throttle signal sent to the engine throttle valve actuator 410 via PWM amplifier 250. The throttle valve actuator 410 adjusts the throttle (not shown) on the engine 500 to adjust for changes in the load requirements.

A signal from the speed summer 210 may optionally be fed to the load shed estimator 300 via the speed loop gains section 220. The load shed estimator 300 sums the signal from the speed summer 210 with a signal 315 from the DC/DC dual boost regulator control 710 that represents the percentage beneath the current limit. The load shed estimator 300 has an independent PI amplifier for each input signal 280 and 315, wherein the outputs are summed together to provide the optional load shed term (LST) 320.

The LST (load shed term) 320 is fed to the PWM inverter controller 810, wherein the AC voltage command is reduced to adjust the output AC PWM voltage PWM signals sent to the inverter power stage 800 for the purpose of shedding VSG engine/generator load by decreasing output AC voltage. The LST (load shed term) 320 is also fed to the speed command generator 100 for use in calculating the desired power out.

As described herein, grid independent AC power inverters 800 behave as sinusoidal voltage sources and provide power directly to the loads 50. The existing power distribution schemes generally require providing power to both 3-phase and single phase or line to neutral connected loads. The 3-phase power inverters for DC-AC accomplish this 3-phase plus neutral requirement by isolating the power inverter from the loads with a delta-wye power transformer. For 3-phase inverters equipped with a balanced dual boost regulator and the transformerless output 3-phase power inverter topology and control described herein, this costly transformer is unnecessary. The transformerless power conditioning system is described in U.S. Pat. No. 6,404,655 which is incorporated by reference.

The generator 600 is also controlled in this embodiment, wherein a programmed AC voltage command (GENERATOR Volts CMD) 330 is provided to the field regulator where it is summed at summing amplifier 340 with a DC feedback signal 350 from the generator. The GENERATOR Volts CMD can be customer selectable and processed through the DSP or it can be set to a default value such as 480 volts. The DC feedback signal 350 is derived from the generator 3-phase AC voltage feedback signal via rectifying feedback amplifiers 390. The resulting generator voltage error signal 360 is fed to the proportional integral amplifier 370, where it is amplified and connected to the field PWM stage 360. The output of the field PWM stage 360 is connected to the generator field winding 420 via PWM amplifier 385. Thus, generator voltage regulation is accomplished by adjusting the field voltage 420 in synchronous type VSG generators 600. The field PWM stage 380 also incorporates a limit function which receives voltage feedback from the feedback rectifying amplifier 390 thereby protecting the field PWM amplifier from overloads and allowing the generator 600 to shed generator loads.

The present invention provides a regulated high quality fixed frequency, low total harmonic distortion (THD), 3-phase 3-wire, or 3-phase 4-wire (includes neutral phase), AC power output to a load for the efficient conversion of power from a variable speed/variable frequency generator. The invention also provides single-phase 2-wire, or single-phase 3-wire (includes neutral phase) AC power output to a load.

The invention includes a means for automatically regulating the generator at the optimum speed/frequency and voltage for a given load such that excessive frictional, pumping, and windage and other parasitic engine losses are not incurred, especially when feeding relatively light loads.

Figure 2:
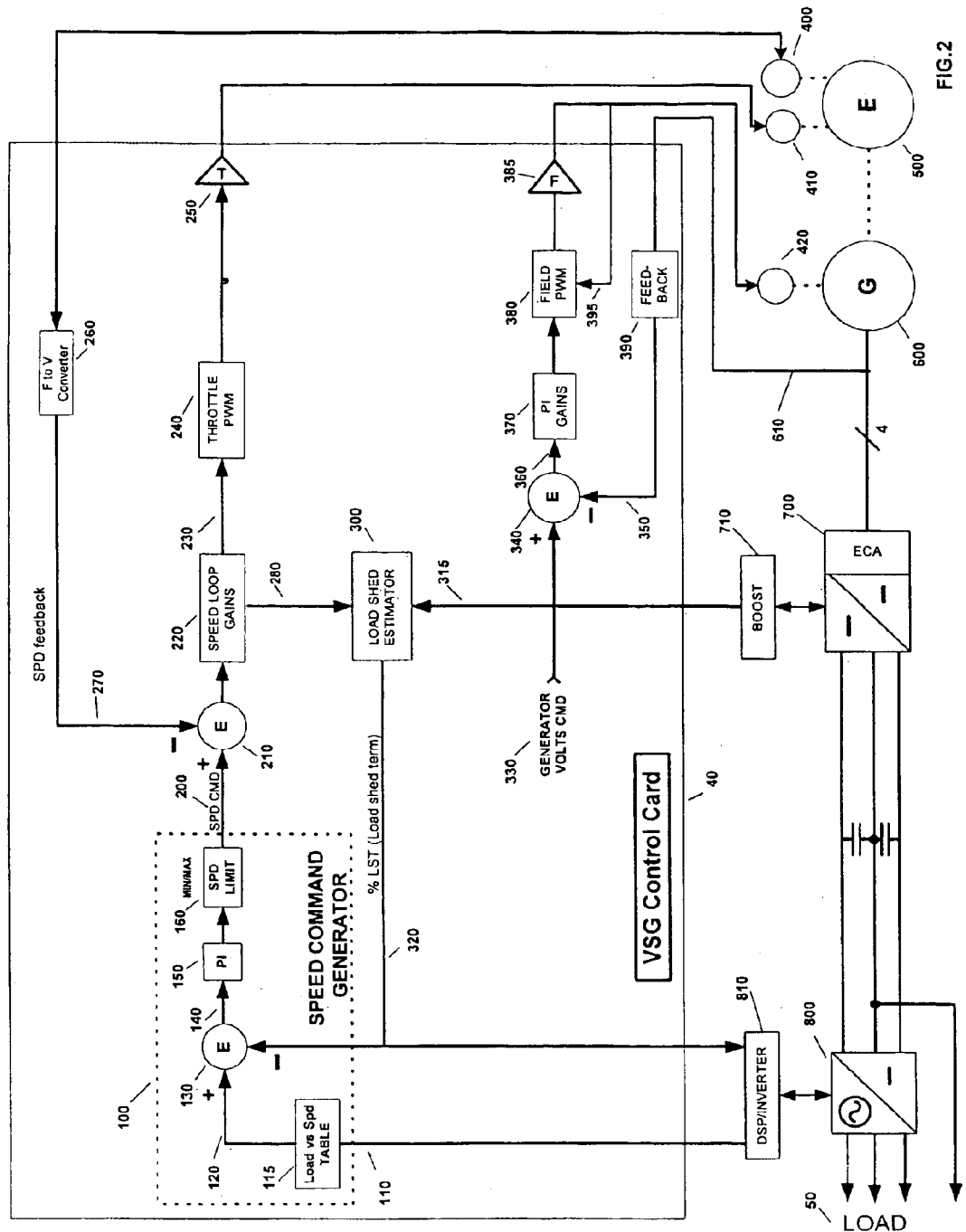
FIG. 2: Detailed block diagram of another embodiment VSG system with speed versus load controller depicted in the simplified primary speed command generator. The primary speed command generator resides in the digital signal processing (DSP) VSG card, and a secondary speed command generator resides in the DSP/Inverter and is used only for extreme transient step loads for load shedding.

FIG. 2 is a block diagrammatic overview of another embodiment of the VSG (variable speed generator) system depicting basic system topology and control scheme. It should be understood that while depicted in an analog fashion for clarity, the actual invention can be implemented with a digital DSP which is more flexible. The VSG is comprised of a transformerless AC PWM inverter 800 and AC PWM control 810. There is an enhanced conduction angle (ECA) dual boost DC bus voltage regulator 700 and ECA dual boost control 710. The generator 600 has an optional field winding 420: for synchronous type generators wherein the generator is coupled to an engine 500 with an electro-mechanical throttle actuator 410 and a speed feedback magnetic pickup 400. The speed feedback comes in other forms, such as tachometers and back EMF generators.

The VSG engine primary "speed command generator" section 100 receives actual output power feedback 110 from the PWM inverter processor 810. In this example, the speed versus load user-programmable lookup table is represented by block 115. The lookup table contents are preprogrammed points that make a curve of optimum engine speed versus load for a given application. The table values selected will vary based on the specific VSG and the type of application. For example, the table can be implemented based upon maximum fuel efficiency, minimum emissions, and optimum transient load response. The VSG engine secondary "speed command generator" resides in the DSP/Inverter 810, and is only used for extreme load transients for load shedding.

The inverter control 810 calculates each AC phase current, voltage and phase angle and sends the actual "real" power out signal 110 to the lookup table 115 where the inverter power out signal drives the lookup table pointer. Thus the actual load defines, according to the selected table, the optimum engine speed for a given "actual load power". The output of the data table 115 is the "indicated speed reference" 120, and is connected to the summing amplifier 130. This signal is summed with the LST (load shed term) 320, at summing amplifier 130, the output of which 140 is the "desired engine power/speed" which is proportionate to the requirement for full output power. The desired engine power/speed 140 indicates the actual AC power out plus the power being shed by the LST signal 320, thereby yielding the amount of power and engine speed required to achieve a no load shed condition for full output AC voltage and thus full load required power.

The desired power/speed signal is sent to the proportional integral amplifier 150 where it is amplified and then sent through the VSG engine speed limiter block 160. The maximum and minimum speed limits are programmed limits from the DSP, appropriate to the specific engine/generator safe limits. The output of 160 is the actual speed command 200.

The speed command 200 is summed with the speed feedback 270, from the frequency to voltage converter 260, which, receives engine speed feedback from the magnetic pick up (MPU) 400. Alternative speed sensors, such as zero crossing detectors connected to the generator magneto, or tachometers are also within the scope of the invention. One of the outputs of the PI speed summing amplifier 210, the speed error signal, is fed to the speed PI loop gain amplifier 220 where it is amplified and sent to the engine throttle valve actuator 400 via PWM amplifier 250.

The proportional portion of the PI speed summing amplifier 210 may also be fed to the load shed estimator 300, where it may be summed "optionally" with the "percent beneath current limit" signal 320, from the DC/DC dual boost regulator control 710. The load shed estimator 300 consists of an independent PI amplifier for each input signal 280 and 320, the outputs of which may be summed together to provide the LST (load shed term) 320.

The load shed term 320 is fed to the PWM inverter controller, wherein the AC voltage command is reduced to adjust the output AC PWM voltage PWM signals sent to the inverter power stage 800, for the purpose of shedding VSG engine/generator 500/600 load by decreasing output AC voltage. The LST (load shed term) 320 is also fed to the speed command generator 100, for use in calculating the desired power out 140 as follows: AC power$_{actual}$–(–AC Power$_{LoadShedTerm}$)=AC power desired.

During fast transient, or step loads, the load shed estimator 300 detects a sudden decrease in engine speed. If this decrease in engine speed reaches a predetermined magnitude, the corresponding large change in the load shed term 320 (which represents a decrease in speed of more than 2–3 Hz) is detected by the inverter DSP 810. If a simultaneous increase in inverter 800 output current occurs, the increase in the current is also detected by the inverter DSP 810. The secondary speed command generator located in the DSP/inverter 810 takes over and instantaneously sheds load power—by decreasing the output AC Voltage—and also sets the percent power output to the primary speed command generator 100 to the maximum. The amount of AC output voltage sag is based on the current engine speed and output power.

The amount of load shed is selected by the secondary speed command generator located in the DSP/Inverter 810, such that the engine 500 has adequate "power margin" to accelerate the engine to a higher speed/power operating point while minimizing the voltage sag. Essentially, the DSP 810 determines the output power at the time of the load increase and sheds only enough load such that the engine has approximately 20% power output left to accelerate to a new and higher operating speed. To allow time for an accurate power calculation, the DSP/Inverter 810 also sets the power out 110 to 100% for determination of the speed command. Thus, the engine speed command momentarily goes to the maximum speed. As the maximum speed is approached, the output AC voltage is then quickly ramped back up to 100% of its nominal value. The secondary speed command generator within the DSP/Inverter 810 is inhibited, and the precisely calculated load power is then used to select the optimum engine operating speed by the primary speed command generator 100 via the load versus speed table 115. The use power curves for engines and other power sources are well known to those skilled in the art.

The load versus speed curve can be digitally selected to follow a user adjustable multi-point curve, or one of the pre-programmed engine specific maximum efficiency, minimum emissions, minimum audible noise, or optimum transient recovery curves. Further operational modes include the load versus speed curve for a general engine type with auto seek mode capability. The auto seek mode allow the generator speed to drift up and down slowly away from the preprogrammed value (within a pre-defined band), while seeking the optimum gains for stability, or fuel efficiency speed for a given load. Although ideally applied to EFI controlled engines, it is also possible to use fuel flow provided by a fuel flow sensor or even to estimate fuel flow based on throttle position, air temperature and engine RPM. Feedback during the gain deviations at a fixed speed and load is derived from the difference between the speed command and the actual speed (the speed error). The object of the gain deviations is to minimize the absolute speed error. Feedback during the speed deviations is ideally derived from EFI controlled engines, although it is also possible to use fuel flow feedback provided by a fuel flow sensor or even to estimate fuel flow based on throttle position, air temperature and engine RPM.

In one embodiment the control printed circuit board (PCB) of the present invention acts as a digital signal processor (DSP) based digital controller, in concert with some analog control circuits. Both the minimum and maximum engine speed limits are digitally selected. The load shed term (LST) and the speed control loops have digitally (or analog) selected proportional and integral terms, and the feedback circuits have analog phase lead and filter circuits for optimum system tuning. Thus, precise closed loop transient performance is accomplished.

A further aspect of the invention is to provide electronically controlled current limiting. This allows the VSG to start and run very difficult, high overload type loads, such as induction motors. This is another method of output power limiting, in addition to power limiting from LST commanded voltage decreases which, provide VSG engine power management. The LST is a somewhat "slow" signal based more on VSG engine time constants, hence it is not fast enough to prevent over current type faults in the PWM inverter, for some vary rapid onset transient overloads. For this purpose, the PWM inverter uses AC output PI current loops which are invoked during overload current conditions and are utilized to limit rapidly increasing AC currents due to instantaneous load changes such as "motor starts".

In one implementation of the present invention the VSG engine may be operated at a programmable speed above the minimum that is required to meet the load. Thus, an offset speed command may be selected to provide for a reasonable margin or head room of engine power to be available for moderate step changes in load. This allows the user to select more "offset speed" or engine power margin to respond to load transients by adjusting the throttle only, thereby eliminating or minimizing the amount of load shedding required to allow the VSG to accelerate to the new load defined speed set point.

Conversely, less speed offset may be selected to enhance efficiency by operating the VSG very close to the speed required to provide output power only. This somewhat compromises the VSG's ability to adjust to transient loads by increasing the magnitude of load shedding required, but this may be less important than maximum efficiency in some applications.

The present invention also provide a means whereby total power output may be quickly and accurately estimated based on the PCS DC Amperes and Volts and/or the AC amps, volts and phase angles and used to provide power feedback to the VSG controller speed command generator circuit. During load shed conditions the load shed term is summed with the actual power out feedback. This provides a composite total "desired power" feedback signal that is used by the VSG speed control where it is compared to a look up table so as to derive the optimum speed command. Different pre-defined look up tables may be stored in the DSP memory which may include different load versus speed profiles for each VSG engine generator set and are optimized for the application; whether for emissions reduction, efficiency enhancement, transient load capability, audible noise reduction, or UPS functionality.

An additional feature of the invention is to provide a closed loop generator voltage regulator, or field control (for synchronous type as opposed to PM type, VSG generators). The field control may be superceded by load shedding commands (normally fed to the output inverter) wherein the generator phase voltages are allowed to collapse to limit VSG load. Additionally, the DC boost stage may also be actively "current limited" to shed load.

The invention also provides a means for limiting the PCS inverter AC currents to accomplish load shedding. This is particularly true for PM (Permanent Magnet) type generators wherein no field control is available to provide control of generator BEMF. Thus the PM type VSG accomplishes load shedding primarily by reducing the PWM inverter's output AC voltages.

Generator 600 voltage regulation is accomplished by adjusting the field voltage 420 in synchronous type VSG generators. A programmed AC voltage command (GENERATOR Volts CMD) 330 is provided to the field regulator where it is summed at amplifier 340 with the generator 3-phase AC voltage feedback signal 610, via rectifying feedback amplifiers 390. This provides a DC feedback signal 350 that is summed with AC voltage command 330, at summing amplifier 340. The resulting generator voltage error signal 360 is fed to the PI (proportional integral) amplifier 370, where it is amplified and connected to the field PWM stage 380. The output of the field PWM stage 380 is connected to the generator field winding 420 via PWM amplifier 385. The field PWM stage 380 also incorporates a current limit function that receives DC current feedback, 395 via shunt resistor with amplifier. This function is used to protect the field PWM amplifier from overloads and also may be allowed to shed generator loads by limiting field current.

In VSG's with PM (permanent magnet) generators no adjustment of the generator back electromotive force (BEMF) is possible, however, all other VSG control techniques described herein still apply. Other types of generators may apply with different types of front end power circuits 700, 710, for example induction or even DC generators. Because of the inherent boost capability of the ECA "AC to DC converter", even very low generator voltages may be boosted up to a usable level.

Figure 3:
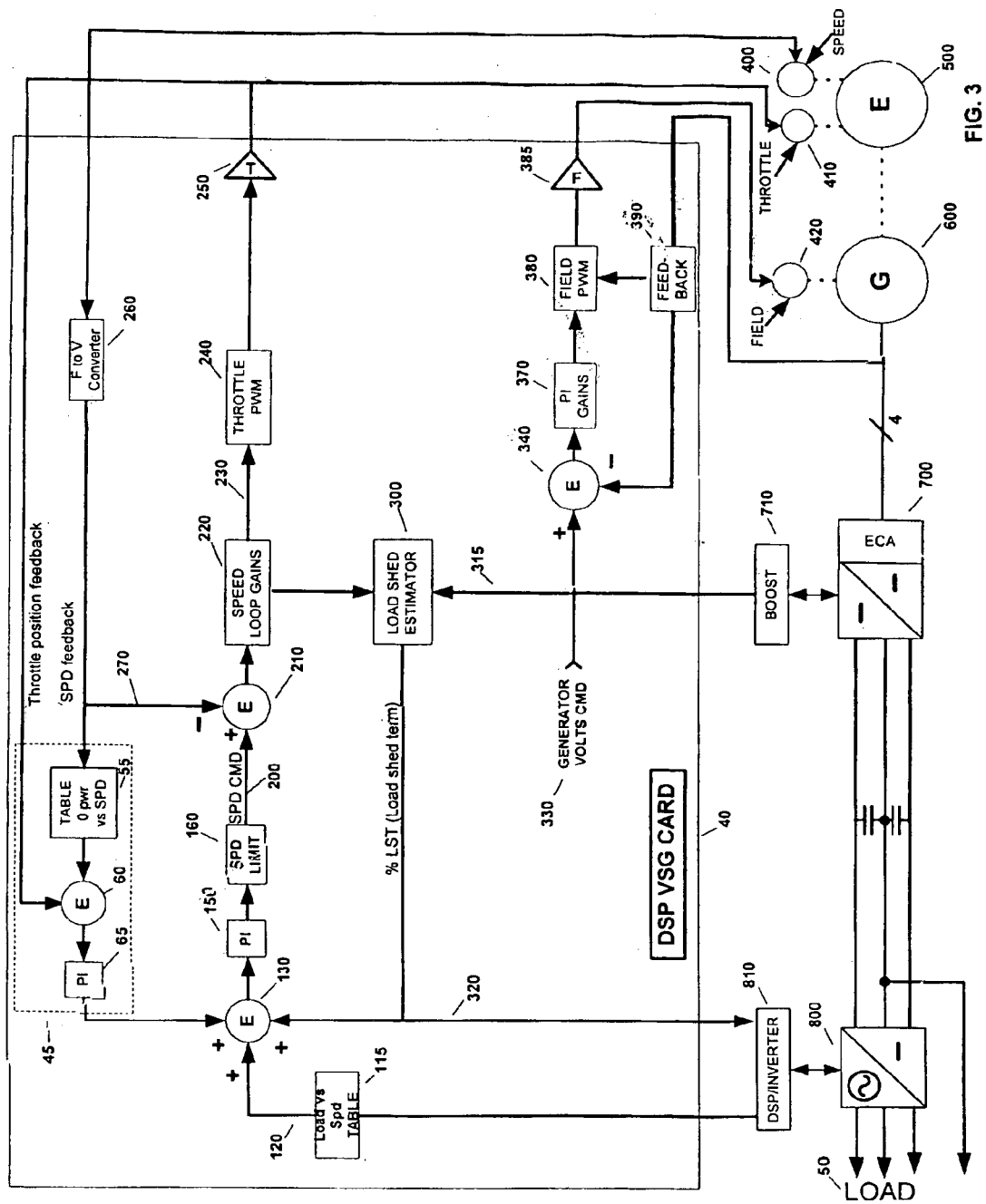
FIG. 3: Block diagram of VSG speed versus load controller depicting simplified adaptive speed correction incorporating auto tune derived throttle optimization scheme for enhanced fuel efficiency, and reduced emissions and throttle position feedback, based on throttle current, for use in fuel consumption and emissions developments.

Referring to FIG. 3, another embodiment of the present invention is illustrated. For the VSG speed versus load controller depicting a simplified adaptive speed correction incorporating auto tune derived throttle optimization scheme for enhanced fuel efficiency, and reduced emissions. This embodiment shows the throttle position feedback variation of FIG. 1, but the power conditioning is integrated within a single VSG circuit card 40. The throttle position feedback system is used to keep track of the throttle position and uses the output signal from the throttle PWM 240 via the amplifier 250 as part of the feedback loop to the speed command generator 100. The throttle valve actuator 410 adjusts the throttle (not shown) on the engine 500 to adjust for changes in the load requirements based primarily on the actual output power and the speed versus load table (see FIG. 2). There is also a small additional input signal from the throttle position feedback loop and table.

The purpose of the small additional input signal from the "throttle position optimization control block" is to optimize the speed command for variables such as temperature, altitude etc, thereby simplifying the main load versus speed table (see FIG. 2). The "Table 0 pwr vs SPD" stores and transmits to the summing junction the expected throttle position for a given engine speed. From the engine speed, the actual load can be inferred. By observing the difference between predicted throttle position and actual throttle position for the given speed (and load), it is possible to estimate how much engine power "margin" remains.

For example, if the actual throttle position is greater than that which is predicted by the "Table 0 pwr vs SPD" then an assumption can be made that the engine is operating closer to the engine maximum power than the optimum setting. Thus a slight correction would be made to the speed command, increasing the engine speed above the point selected by the "load vs speed table" (see FIG. 2). This allows the engine operate with the correct (increased) power margin regardless of environmental variables such as altitude, temperature, and fuel quality. The engine power "margin" is an indication of how close the engine is operating to the absolute maximum engine power for a given speed, and is the main criteria for operating at optimum fuel efficiency and minimum emissions.

Another consideration for the "throttle position optimization control block" is that engine power margin defines the optimum speed loop gains (proportional and integral) for stable steady state operation, as well as transient step loads. In cases where the throttle position feedback is not directly available or the throttle current varies significantly from unit to unit, another method of speed loop gain adjustment is employed.

By observing the difference between the speed command and the actual speed (the speed error) with the DSP, it is possible to detect excessive steady state speed errors. When this occurs, the DSP applies an adaptive speed loop gain algorithm wherein the overall speed loop gain is alternately increased above the nominal gains and the speed error observed, and then decreased below the nominal gains followed by an observation period. This perturb and observe process is repeated with greater magnitudes of gain change each time until the steady state speed error is some predefined level, such as less than 0.25 Hz. While this technique does not redefine the load versus speed operating point, it does allow the variable speed genset to operate throughout a wide range of environmental variables such as altitude, temperature, and fuel quality in a stable manner.

Other embodiments include where the VSG control can communicate directly with the engine to obtain engine power information such as power margin, % power, or torque, any of which can be used to optimize the speed versus load setpoint (speed command).

The inverter control 810 calculates each AC phase current, voltage and phase angle and sends the actual power out signal 110 to the lookup table 115 to find the appropriate speed reference. The indicated speed reference signal 120 is connected to the summing amplifier 130. This signal is summed with the LST (load shed term) 320 and the throttle position feedback signal. The load shed term and indicated speed reference signal has been described herein.

The throttle position feedback signal is processed from the speed error signal from the proportional integral (PI) speed summing amplifier 210 that is fed through the speed loop gains PI amplifier 220. The speed loop gains output signal 230 is coupled to the throttle pulse width modulator (PWM) 240 that processes the throttle signal sent to the engine throttle valve actuator 410 via PWM amplifier 250 and also to the throttle command generator section 45. The throttle command generator uses the SPD feedback 270 signal in conjunction with a look table 55 for zero power versus speed to drive the lookup pointer for the zero power for a given speed. The output of the lookup table 55 is summed and amplified by summer 60 along with the throttle position feedback. The output of the summer 60 is fed through a proportional integral amplifier 65.

Figure 4:
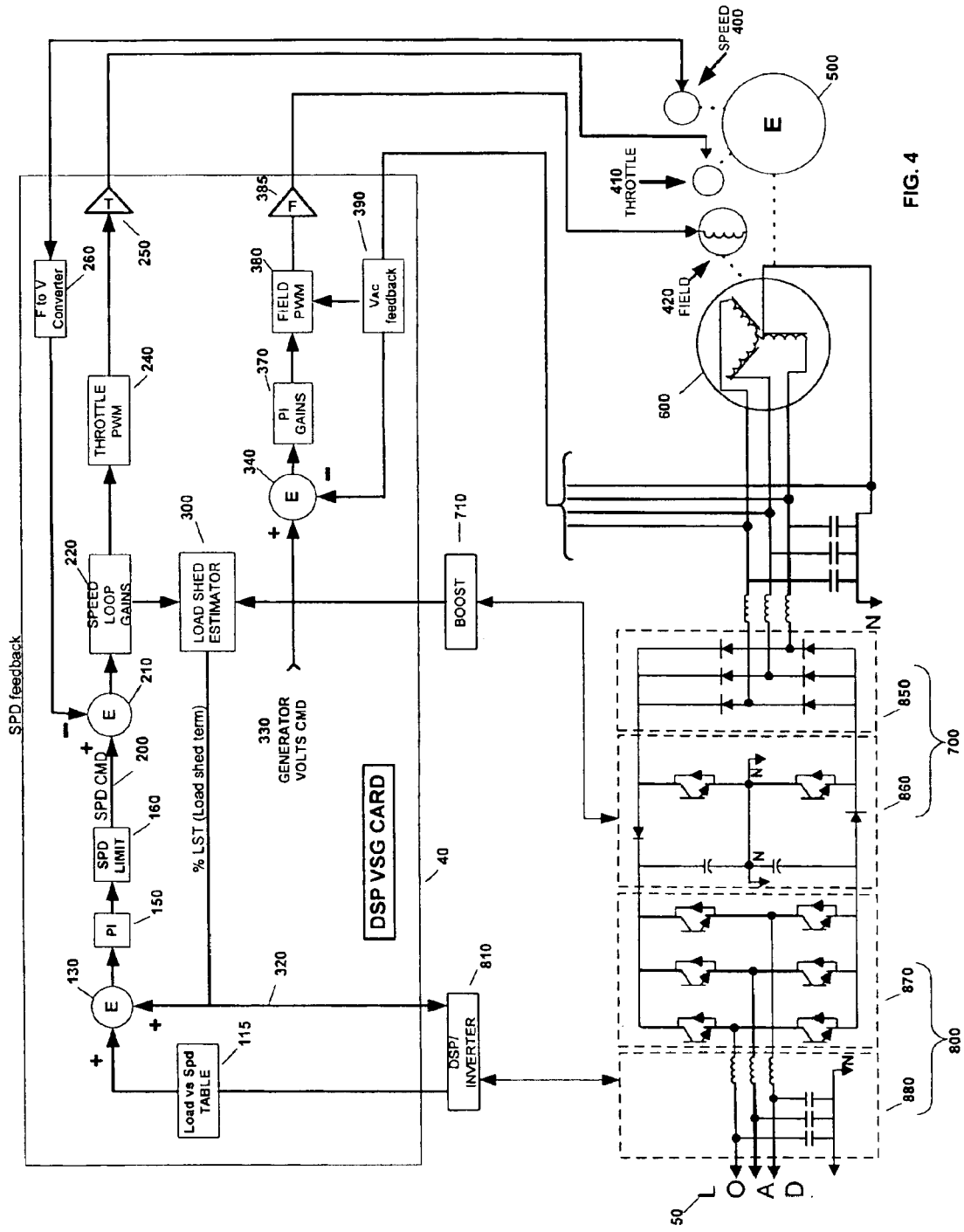
FIG. 4: Schematic of 3-phase, 4-wire power conditioning system with VSG speed versus load controller depicting simplified power electronics circuit topology.

FIG. 4 shows a 3-phase, 4-wire power conditioning system with VSG speed versus load controller. In this embodiment the generator is a 3-phase 4-wire device coupled to the field winding 420. The AC output of the 'generator' 600 for all four lines is used for the VAC feedback 390 in the generator voltage command feedback loop.

The transformerless dual boost regulator system couples the AC power source from the generator to a rectifier section 850. The rectifier diodes 850 rectify the AC source to DC signals that are coupled to a DC-DC converter section 860. The output of the DC-DC converter 860 goes through an inverter section 870 and a filter section 880 and is output is a 3-phase 4-wire AC signal coupled to the load 50.

It should be readily apparent that the present invention applies not only to DC-AC inverters, but also to other electric power conversion systems, such as static inverters, rotary converters, cycloconverters, and AC-AC motor generator sets. The static inverters and rotary converters are motor-generator sets that convert DC electricity to AC electricity. Cycloconverters and AC to AC motor generator sets convert AC electricity to AC electricity. Furthermore this invention also pertains to other types of "prime movers" than the above mentioned internal combustion engine, such as turbines, Stirling and other prime mover that generates differing amounts of power at different RPM's.

Figure 5:
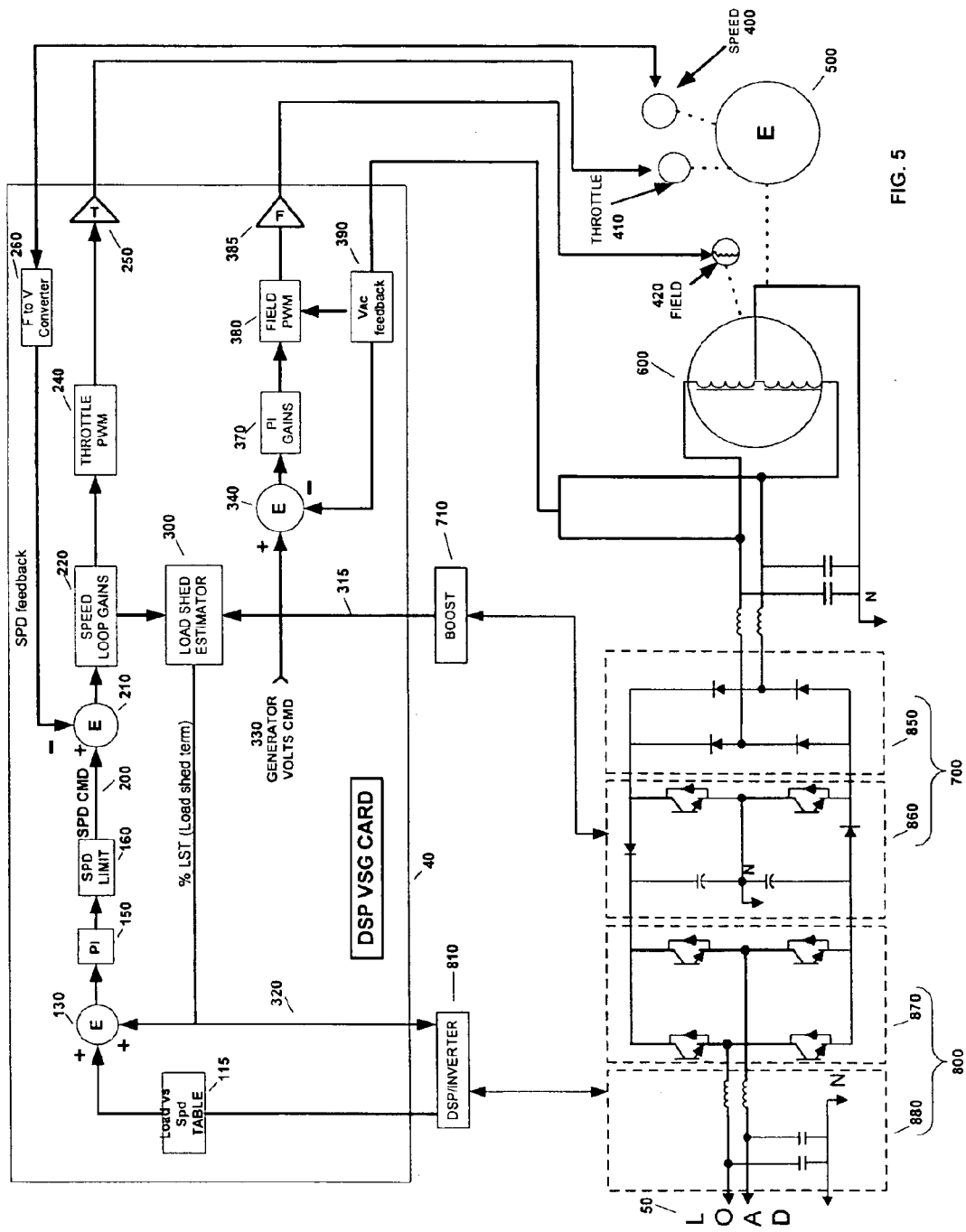
FIG. 5: Schematic of single phase, 3-wire (such as 120/240 Vac) power conditioning system with VSG speed versus load controller, depicting simplified power electronics circuit topology and single phase alternator.

Referring to FIG. 5, a single-phase, 3-wire (such as 120/240 Vac) power conditioning system with VSG speed versus load controller is shown for a single-phase alternator. In this embodiment the 'generator' 600 is a single-phase alternator providing the AC source for the rest of the transformerless DC dual boost regulator system. The rectifier diodes 850 rectify the AC source to DC signals that are coupled to a DC-DC converter section 860. The output of the DC-DC converter 860 goes through an inverter section 870 and a filter section 880 and is output is a 3-phase 4-wire AC signal coupled to the load 50.

Figure 6:
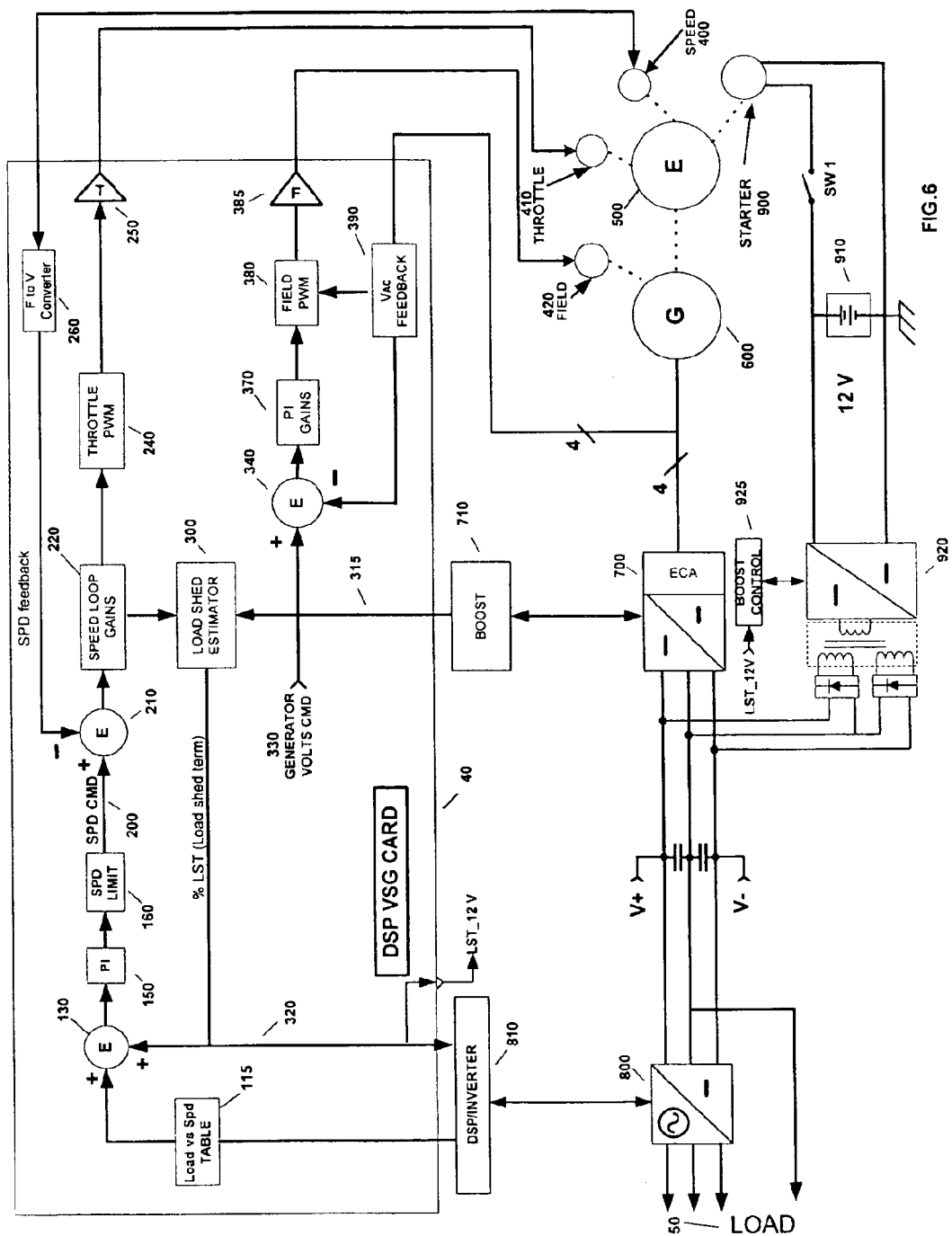
FIG. 6: Block diagram of VSG system depicting auxiliary input from generator starting battery for mitigation of step load induced voltage sags.

The block diagram in FIG. 6 shows the VSG system with an auxiliary input from a generator starting battery 910 for mitigation of step load induced voltage sags. In this embodiment the engine 500 is switchably coupled via switch SW1 to a starter 900 that is coupled to the battery 910. There is a DC-DC converter 920 coupled to the output of the dual boost DC regulator 700 with a stepdown transformer within the converter to supply the proper load. There is an auxiliary boost control 925 that uses a signal (LST_12V) from the DSP card 40 which represents the load shed term 320 indicating how much power is required to boost the engine 500.

Figure 7:
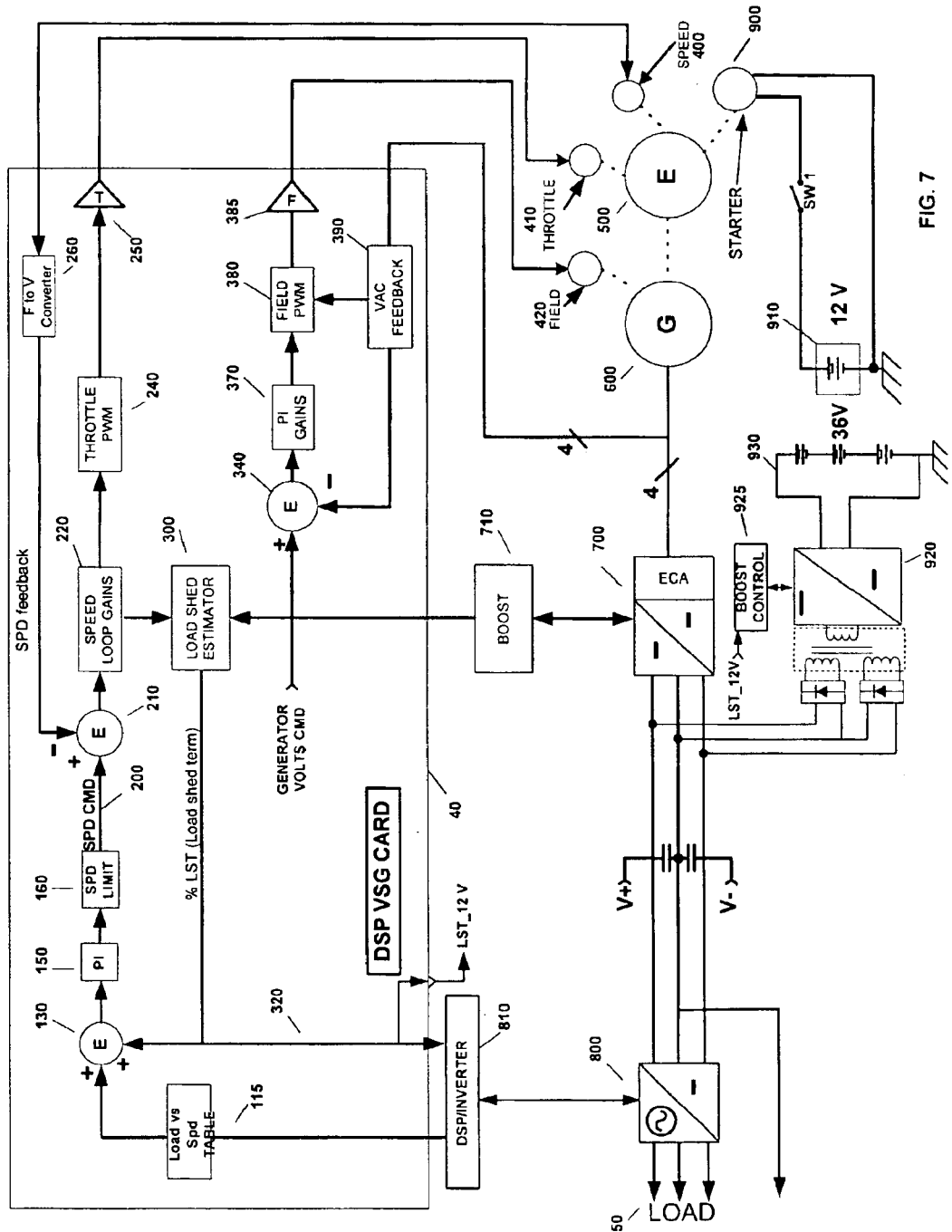
FIG. 7: Block diagram of VSG system depicting auxiliary input from external energy storage module for simultaneous function as an uninterruptible power source, mitigation of step load induced voltage sags, and generator starting.

Referring to FIG. 7, a block diagram of the VSG system depicting an auxiliaryinput from an external energy storage module (ESM) is shown for simultaneous functionality as an uninterruptible power source (UPS) with mitigation of the step load induced voltage sags, and including generator starting. There is a DC-DC converter section 920 with a stepdown transformer coupled to the dual boost DC lines. A boost control 925 is coupled to the load shed term 320 via LST_12V signal line.

Figure 8A:
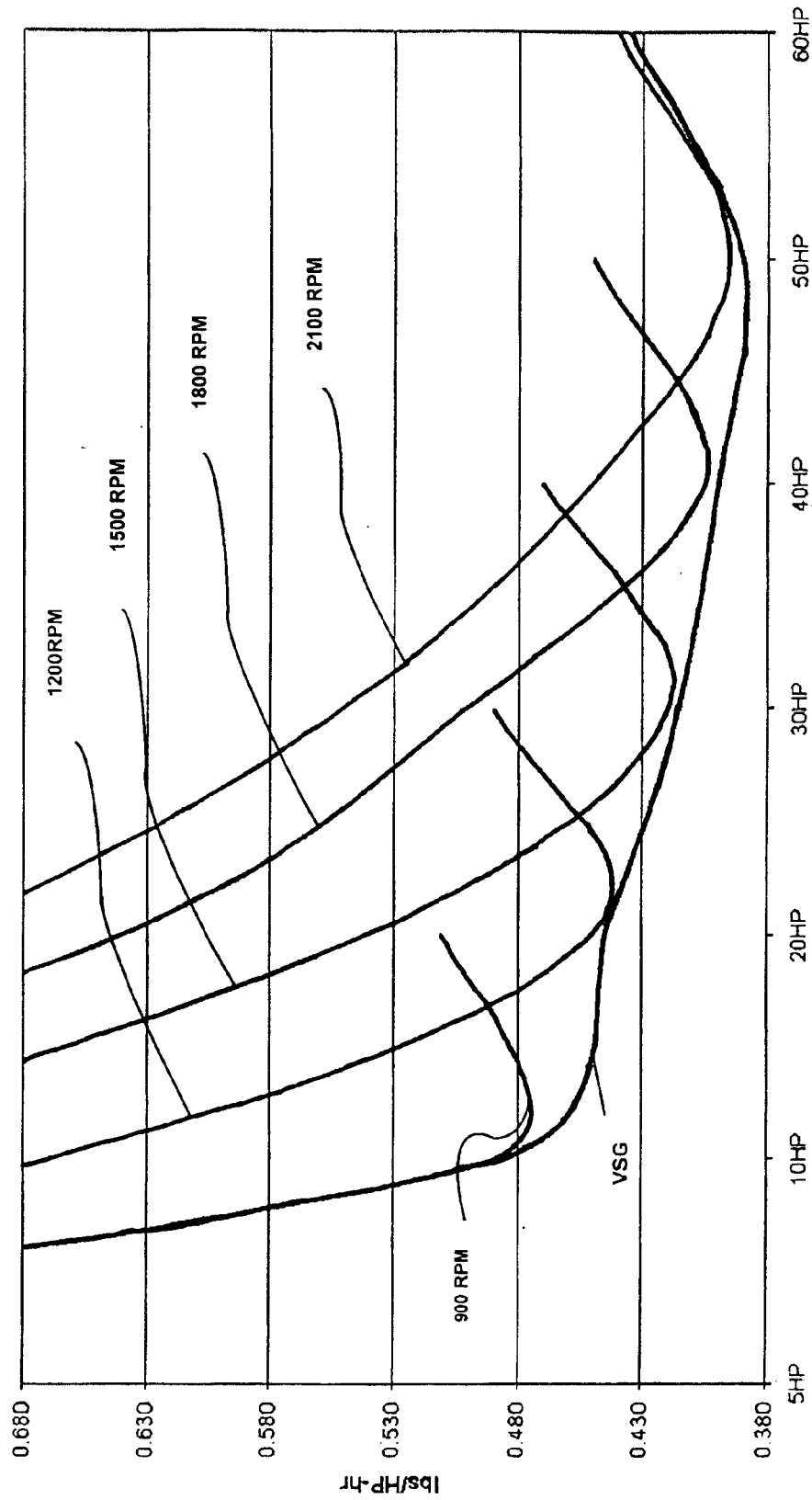
FIG. 8a: Shows the power curves for the Ford LRG 425 showing the brake specific fuel consumption (BSFC) versus horsepower and speed.
Figure 8B:
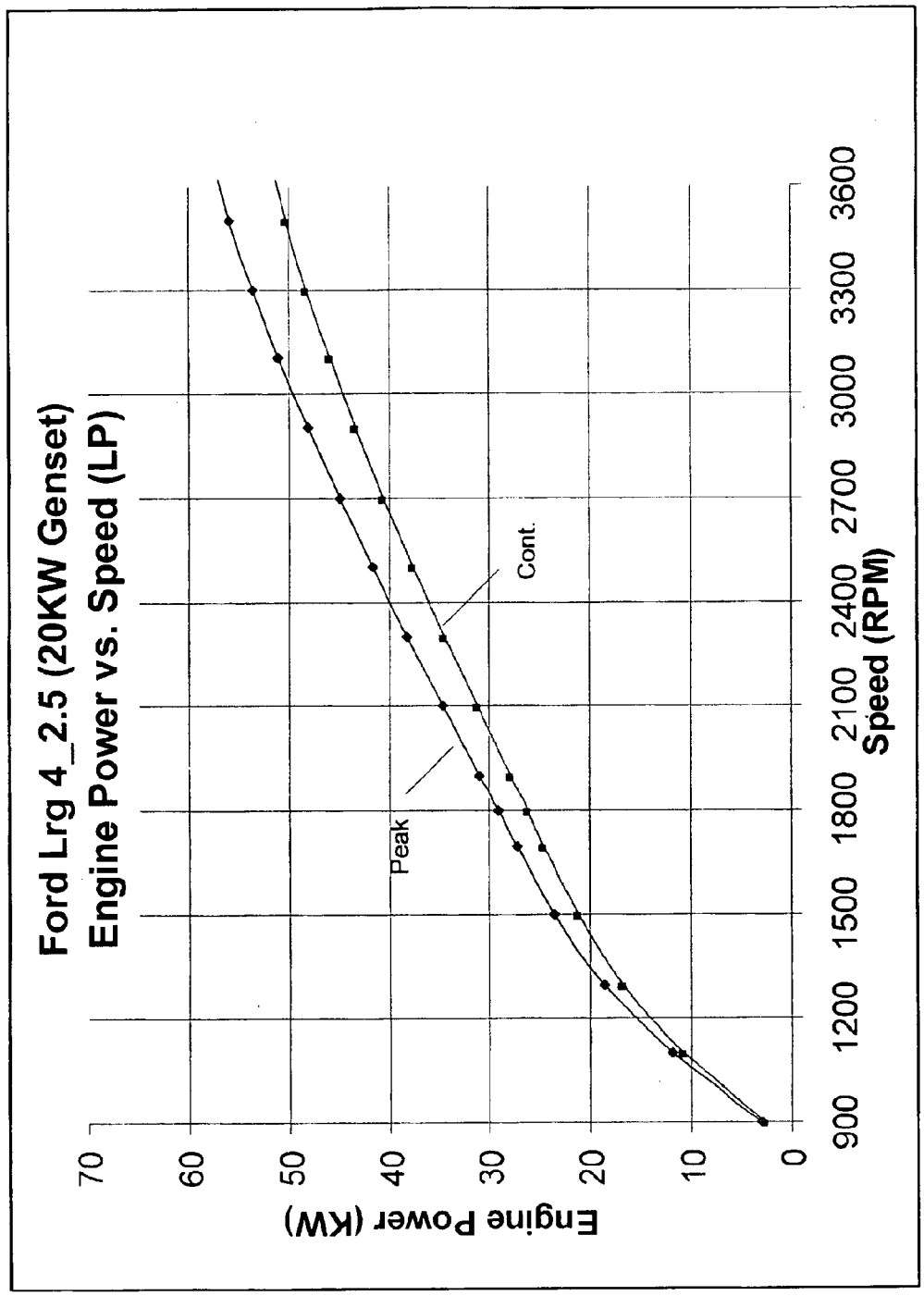
FIG. 8b: Shows the power curves for the Ford LRG 20 KW Genset of engine power versus speed.

The significance of the present invention is graphically demonstrated by referring to FIG. 8a and FIG. 8b. The waterfall curves of FIG. 8a show the brake specific fuel consumption (BSFC) versus horsepower and speed for the Ford LRG 425 engine. BSFC is defined as the amount of fuel an engine uses to make one horsepower for one hour and uses units (lbs/HP-hr) on the y-axis. The x-axis represents the horsepower and ranges from 5–60 HP. There are six curves presented namely, VSG, 900 RPM, 1200 RPM, 1500 RPM, 1800 RPM and 2100 RPM. The lowest fuel consumption is the VSG. FIG. 8b shows the engine power versus speed for the Ford LRG 425 20 KW Genset that depicts how the engine power (KW) increases with speed (RPM) with operation at peak (the upper curve) and continuous operation (the lower curve).

One example of the process flow for the present invention is described herein. Assuming that the VSG system is operating and producing an AC output to the load, and there is an increase in the load demand, the DSP/Inverter senses the step load condition and the step load condition is input to the speed command generator section. The lookup table for load versus speed indicates the set point for the higher RPM value to accommodate the increased load condition. The speed command generator section examines the load shed term to determine if there is adequate head room to satisfy the increased RPM response and whether shedding of some portion of the load is required or desirable. The engine parameters are evaluated to ensure the increased RPM value is within the capability of the engine.

A speed command is issued from the speed command generator and is processed by the proportional integral (PI) speed summing amplifier along with the SPD feedback signal. The SPD feedback signal represents the actual speed of the engine that is affected by various factors. Based on the actual speed of the engine as compared to the set value, a difference value can be generated to compensate for the factors. If there is no load shedding, the corrected speed command value is amplified and pulse width modulated and transmitted as a throttle signal to the engine throttle valve actuator to adjust the engine throttle and increase engine speed for the increased load.

If there is some load shedding, the engine speed is decreased by some proportional amount based on the amount of load being shed. The load shed term is processed by the inverter and shed a portion of the load.

An additional objective of the present invention is a high "power quality" type application where an additional Energy Storage Module (ESM) is connected to the power conditioning system, and more particularly, to the DC bus link of the PCS. This provides for rapid sourcing of power from the ESM to the transient load, thereby shedding load from the VSG while allowing time for the VSG to settle at the new "load defined" optimum speed. The local ESM allows quicker engine response to occur by providing energy to the load while the engine/generator is climbing to the new speed set point, thus, no output voltage sag (load shed) is required.

The present invention allows for the energy storage module (ESM), typically batteries or flywheel, to be used to provide overload power. Such an embodiment can use the load shed term as a command to the ESM to feed power into the DC bus. This would offload the engine and allowing it to climb to the optimum load dependent RPM with no need to reduce output AC volts or to shed engine load to allow RPM adjustment. This also allows ESM power to be added to VSG power thereby increasing total output power capability.

An additional aspect of this invention provides a means for charging an ESM while simultaneously providing output power to the load. It should be noted that this ESM charging power is in addition to the output or load power, and sensed at the DC link (Volts and Amperes). Thus, total power required from the engine-generator including the load power plus ESM charging power is accurately estimated and fed back to the speed command generator.

A further variation of the invention is to provide a PCS bypass option such that the VSG may be operated at a fixed frequency and voltage as a standard generator, thereby providing load power even after an inverter fault. This precludes any of the VSG fuel efficiency enhancements, emissions reductions, or audible noise reductions but does allow for improved overall VSG system reliability and redundancy. The bypass can be a simple switched path that circumvents the PCS under certain conditions such as a switched path connecting the generator output to the load.

A further feature of the invention is to provide 3-phase 4-wire output power that is more efficient and at substantially lower cost than other distributed power generation technologies. Additionally, the transformerless power inverter system wherein the regulated AC source is single phase (2 or 3-wire). Also, a transformerless power inverter system, wherein the regulated AC source is three-phase (3 or 4-wire).

The present invention described herein is thus a flexible system that can take on multiple forms and provide significant functional benefits. The invention improves fuel efficiency by reducing speed (or operating at optimum speed for given load) during light load conditions. The audible noise is reduced by reducing speed (or operating at optimum speed for given load) during light load conditions. There is an enhanced instantaneous overload or transient load capability by running VSG engine continuously at a higher RPM that places it higher on the engine power curve. There is also an enhanced instantaneous overload or transient load capability accomplished with an externally applied overload warning signal, which accelerates the VSG engine to a higher RPM establishing a point higher on the engine power curve just prior to the application of an overload.

The intermittent overload capability is greatly increased by allowing brief (power/time limited) excursions to higher engine RPM (higher on the engine power curve). The system emissions are reduced by operating the engine at the optimum RPM for given load conditions. This can be done by pre-programmed lookup table or via exhaust content sensors such as oxygen sensors, C02 sensors, and HC sensors for closed loop emissions reduction. The power factor (PF) is improved from generator (near unity PF), regardless of the load PF. The PWM inverter converts low PF loads to unity PF at the generator, thereby increasing efficiency and even increasing maximum power out from generator.

Further benefits include increasing maximum continuous power from VSG engine/generator by running at RPM slightly above nominal at higher point on engine power curve (for example 70–80 Hz), which depends on the generator design margins. The life of VSG engine/generator is increased by running the generator at reduced RPM's for nominal loads (less than full rated), and maintenance costs will be lowered. Fuel efficiency is improved by reducing the engine speed during the light load conditions.

The method of the present invention adjustably controls the optimum engine speed versus load by automatically reducing output inverter AC voltage, such that the VSG engine has enough power to simultaneously feed the reduced load while increasing to a higher RPM (higher point on engine power curve). In one embodiment the method to control the optimum engine speed versus load is with a pre-programmed lookup tables for a variety of different applications such as maximum efficiency, minimum emissions, minimum audible noise, optimum transient response. The invention can also be altered for different "control modes".

The present system allows a smaller size, weight, and cost engine to be used at a higher, or load dependent RPM. Small generators can now use a 3-phase, not single-phase generator thereby reducing winding/steel as well as cost, size, and weight.

As described herein, the non-linear load performance is significantly improved as compared to a standard generator. The transformerless PWM inverter has much lower output impedance thereby allowing use of the VSG on 100% non-linear loads with no de-rating, allowing the VSG engine/generator to be sized for the load rather than oversized. This has tremendous fuel efficiency, and emissions benefits primarily due to smaller engine size.

No warranty is expressed or implied as to the actual degree of safety, security or support of any particular specimen of the invention in whole or in part, due to differences in actual production designs, materials and use of the products of the invention.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. An apparatus for generating AC power to a load, comprising:

a variable speed energy generating device producing differing amounts of power at different speeds;

a power conditioning system coupled to said variable speed energy generating device, wherein said power conditioning system calculates a speed command based on said AC power that controls said variable speed energy generating device;

a regulator section coupled to said power conditioning system;

a converter coupled to said regulator section and producing said AC power, wherein said converter couples said AC power to said load a speed sensor coupled to said variable speed energy generating device and an adaptive speed loop gain algorithm for detecting steady state speed errors.

2. The apparatus according to claim 1, wherein said converter is selected from the group consisting of: transformerless AC pulse width modulator inverter, DC-AC inverter, static inverter, rotary converter, cycloconverter, and AC-AC motor generator set.

3. The apparatus according to claim 1, wherein the variable speed energy generating device is selected from the group consisting of: internal combustion engine, turbine, micro-turbine and Stirling engine.

4. The apparatus according to claim 1, wherein said regulator section is an enhanced conduction angle dual boost DC bus voltage regulator.

5. The apparatus according to claim 1, further comprising a field winding coupled to said variable speed energy generating device.

6. The apparatus according to claim 1, wherein said speed command is derived from engine speed versus load lookup tables.

7. The apparatus according to claim 1, wherein said speed command is calculated from exhaust content sensors.

8. The apparatus according to claim 1, further comprising a bypass switch coupling said variable speed energy generating device to said load.

* * * * *